United States Patent [19]

Parsons

[11] Patent Number: 5,557,543
[45] Date of Patent: Sep. 17, 1996

[54] TRACKING APPARATUS

[75] Inventor: Timothy J. Parsons, Bristol, Great Britain

[73] Assignee: British Aerospace Public Limited Company, Farnborough, England

[21] Appl. No.: 228,396

[22] Filed: Apr. 15, 1994

[30] Foreign Application Priority Data

Apr. 29, 1993 [GB] United Kingdom .................... 9308927

[51] Int. Cl.$^6$ .................................................. G06F 17/00
[52] U.S. Cl. ............................................................ 364/516
[58] Field of Search ............................. 364/516; 235/411; 356/3; 342/55, 56, 58, 160

[56] References Cited

U.S. PATENT DOCUMENTS

| | | | |
|---|---|---|---|
| 5,036,474 | 7/1991 | Bhanu et al. | 364/516 |
| 5,103,484 | 4/1992 | Stafford et al. | 364/516 |
| 5,390,125 | 2/1995 | Sennott et al. | 364/459 |
| 5,432,712 | 7/1995 | Chan | 364/514 R |

FOREIGN PATENT DOCUMENTS 59-201180  11/1984  Japan .
60-218072  10/1985  Japan .

OTHER PUBLICATIONS

Hwang et al: "A Visual Feedback Control system for Tracking and Zooming a Target", Proceedings Of The 1992 International Conference On Industrial Electronics, Control, Instrumentation And Automation, Nov. 9–13, 1992, pp. 740–745, XP356727.

Baroni, et al: "Assessing LV wall motion by frame to frame curvature matching and optical flow estimation", Computers In Cardiology, Sep. 23–26, 1991, IEEE Computer Society Press, pp. 477–480 XP312461.

*Primary Examiner*—Ellis B. Ramirez
*Attorney, Agent, or Firm*—Cushman, Darby & Cushman

[57] ABSTRACT

Apparatus suitable for tracking a road vehicle from an aerial platform uses a correlator (5) for processing data received from a thermal imager (1). The apparatus derives a binary template for use by the correlator (5), the template (13) being based on points of high curvature (12) in an object to be tracked. The invention shows a significant reduction in mistracking and drift compared with conventional correlation trackers under the conditions of high density of features similar in nature to the object of interest, such as typifies the imagery obtained from a ground-pointing camera mounted on an aerial platform.

7 Claims, 3 Drawing Sheets

TRACKING APPARATUS

FIELD OF THE INVENTION

This invention relates to apparatus for tracking objects and is particularly applicable to the tracking of road vehicles from an aerial platform in an urban environment.

The invention is intended for use in conjunction with imaging apparatus which produces a sequence of images of a scene containing an object e.g. a vehicle of interest. The invention is configured to process imaging data generated by the imaging apparatus and to generate a fix point within each successive image which indentifies the position of the object of interest.

DESCRIPTION OF THE RELATED ART

An aim of the invention is to provide tracking apparatus which is less prone to mistracking and drift than known systems which employ conventional, multiplicative correlation processes. In particular, when the feature density is high, conventional trackers will tend to mistrack between features. Additionally, with low contrast features, the fix point provided by conventional trackers will drift towards significant edge structure associated with the feature.

The invention shows a significant reduction in both mistracking and drift compared with the conventional trackers and is particularly useful under the following conditions:

i) when images contain a high density of features of similar spatial frequency to that of the feature of interest;

ii) when features are predominantly low contrast against the local background image;

iii) when no underlying assumptions can be made about the nature of the feature to be tracked.

SUMMARY OF THE INVENTION

The tracking apparatus of this invention includes an input device for receiving a succession of images comprising the object contained within a reference patch within a background scene;

a first processor for producing a first set of data relating to regions of significant curvature within the reference patch;

a second processor for forming a binary template from the first set of data;

and third processors for correlating the binary template with scene images to generate a fix point representing the position of the object within the background scene.

Thus, points of high curvature are selected from a grey scale image and then thresholded to form a binary image. The binary points form seeds about which a morphological dilation can be effected.

In one embodiment, a multiplicative correlation between the reference patch and the successor image is calculated, but only at those points defined as non-zero within the binary image derived from the high-curvature points within the reference patch. The position of the maximum correlation sum between reference patch and successor image equates to the fix point.

In a second embodiment, a feature point matching technique is used between discrete areas of the binary template and corresponding regions in the subsequent image.

Unlike some known trackers such as those based on the Hough transform, the invention makes no assumptions about the underlying image content. By deriving a recognition binary template automatically from a reference image (a data-driven technique), the response of the matching process is nearly optimal, assuming that the form of the object does not vary greatly between images. The template derived from the high curvature points in effect ensures that correlation only occurs in the immediate locality of significant physical structure. Additionally, the template captures relational information, i.e. records the relative spatial layout of this structure, and biases the correlation to portions of the image which contain the same spatial distribution of significant features.

The invention has been shown to work robustly on sequences of thermal images in the 3–5 micron band and 8–12 micron band.

BRIEF DESCRIPTION OF THE DRAWINGS

Some embodiments of the invention will now be described by way of example only with reference to the drawings of which.

DETAILED DESCRIPTION OF THE PREFERRED EMBODIMENTS

Figure 1:
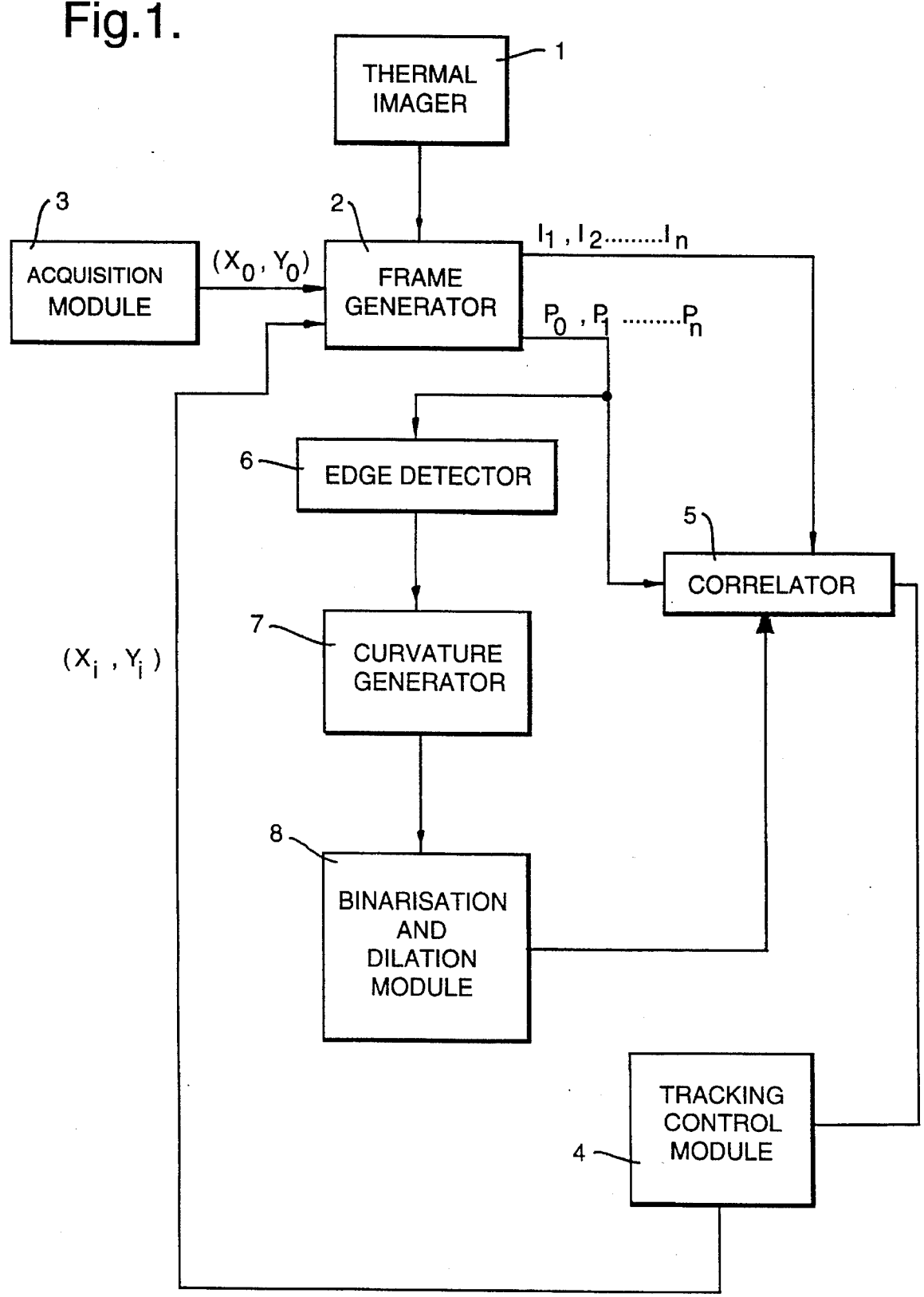
FIGS. 1 and 2 are schematic diagrams of alternative embodiments of tracking apparatus in accordance with the invention.

FIG. 1 shows, in block form, a thermal imager 1 arranged to view an urban scene from an aerial platform such as a helicopter. The scene may at any time contain a road vehicle whose position is to be tracked. A scene image is operated on by a frame generator 2 connected to the output of the imager 1. The frame generator 2 also receives input signals $(X_0, Y_0)$ from an acquisition module 3 and a further set of input signals (Xi,Yi) from a tracking control module 4. The frame generator 2 has a first output composed of a time sequence (or successive frames) of grey scale images $I_1$, $I_2$, ... $I_n$ comprising the urban scene. A second output, when a series of fix points (Xi Yi) are provided by the tracking control module 4, comprises a sequence of grey scale reference patches $P_0$, $P_1$ ... $P_n$. Each reference patch defines an area within an associated image of the urban scene which contains the vehicle to be tracked. The initial patch $P_0$ is generated by a fix point generated by the acquisition module 3.

Each of the two outputs from the frame generator 2 is fed to an input of a correlator 5. In addition, the second output of the frame generator 2 composed of reference patches $P_0$ ... $P_n$ is applied to the input of an edge detector 6. The output of the edge detector 3 is subsequently applied to the input of a curvature generator 7. The output of the generator 7 is fed into a binarisation and dilation module 8 whose output forms a third input to the correlator 5.

An output from the correlator 5 can be used by the tracking control module 4 to adjust the attitude of the imager 1 so that, e.g. the field of view is always centred on the tracked vehicle.

In operation, a first reference patch $P_1$ is operated on by the edge detector 6. The process involves a local edge detection in both horizontal and vertical directions. A typical implementation uses a 5*5 local edge detector to produce two edge maps.

In the next operation, performed by the curvature generator 7, the two edge maps are multiplied together and normalised by a function which is a sum of the two edge maps for non-zero points. The resulting image is a simplification of (but related to) the Gaussian Curvature of the image surface.

The output of the generator 7 is next processed by the binarisation and dilation module 8. The derived curvature image (which can be considered to shadow the reference patch $P_1$) from the generator 7 is thresholded and binarised to form a binary image of high curvature points. It has been found that the signal to background ratio is very high and that the threshold value chosen is non-critical for a wide range of values. This property contributes to the robustness of the above process for a large range of image types.

The points comprising the binary image are modified by the module 8 by executing a morphological dilation around each high curvature point. This results in a "smearing out" of each point.

Figure 3A:
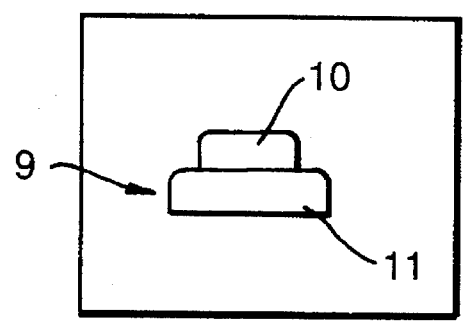
FIGS. 3A, 3B and 3C represent images of a tracked vehicle at three different stages of data processing.
Figure 3B:
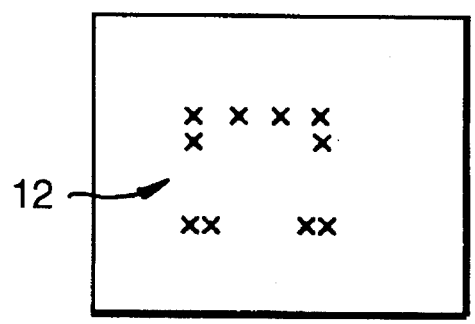
Figure 3C:
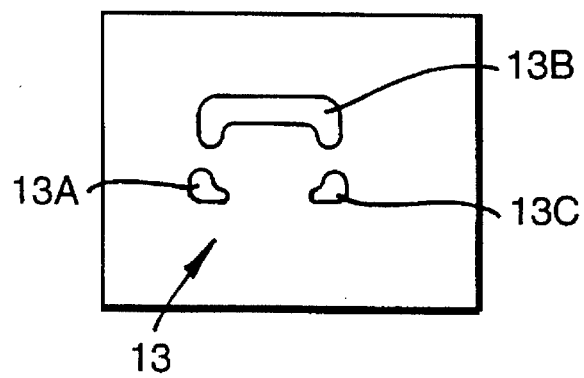

The above process is illustrated in FIGS. 3A to 3C. FIG. 3A represents a thermal image of a scene showing a road vehicle 9. A thermal picture would show regions of high contrast and curvature around the windscreen 10 which reflects a cold sky and the area 11 around the wheels which are hot. FIG. 3B shows the binarised image of high curvature points 12 and FIG. 3C represents the result of the dilation process. The output of the binarisation and dilation module forms a binary template 13. The extent of the dilation can be pre-set depending upon the scale of features within the reference patch image.

The output template from the module 8 is used in a correlation process by the corelator 5. In this final stage, a multiplicative correlation is executed between a reference patch, $P_1$ say, and a successive image, in this case, $I_2$. However, the correlation sum is only accumulated for non-zero points within the binary template 13. In this manner, the correlation occurs at significant regions within the image i.e. those in the vicinity of the high curvature points. Hence the signal to background ratio is enhanced. The output of the correlator is a fix point which locates the position of the vehicle within the image $I_2$. The entire process is repeated for the next reference patch $P_2$ which is correlated in similar fashion with the successive image $I_3$, and so on.

If desired, the correlator 5 can be configured to produce a correlation surface resulting from the correlation process described above. Such a surface will show Greater localisation of the image feature of interest and a higher signal to background ratio than a correlation surface corresponding to the conventional multiplicative correlation process.

Figure 2:
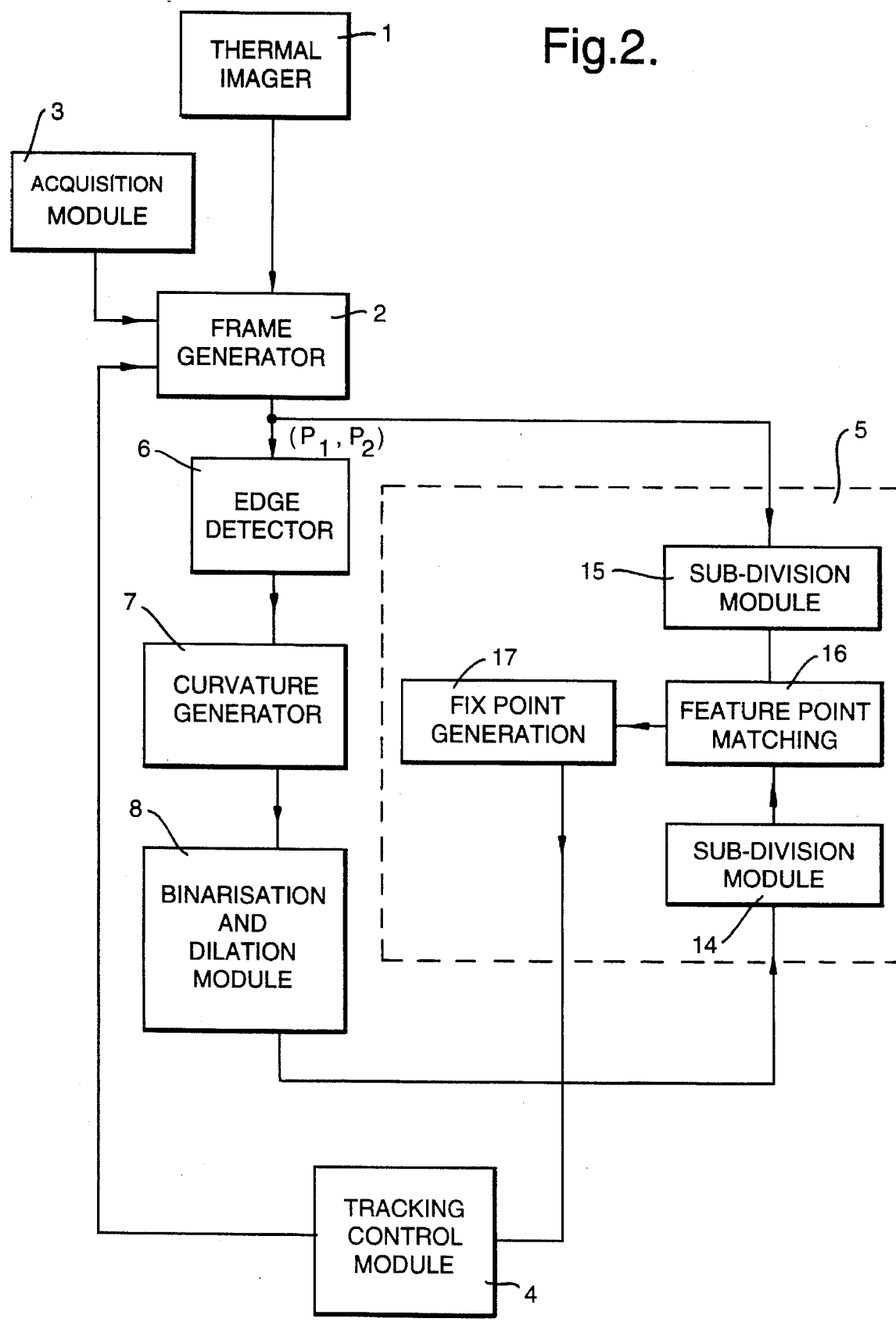

Reference will now be made to FIG. 2 which represents an alternative embodiment. Components common to both first and second embodiments have been designated by the same reference numerals.

In FIG. 2 a reference patch, $P_1$, say, from a Grey scale image provided by the thermal imager 1 is processed by the edge detector 6, the curvature Generator 7 and the binarisation and dilation module 8 in the same manner as described with reference to FIG. 1. The difference between the two embodiments lies in the function of the correlator 5. Essentially, a subtractive correlation process is employed rather than a multiplicative correlation process.

The dilated binary image appearing at the output of the module 8 is subdivided within the correlator by sub-division module 14 into a number of sub-patches corresponding to each distinct region in the binary image e.g. regions 13A, 13B and 13C in FIG. 3C. Similarly the reference patch $P_2$ contained within the successive grey scale image $I_2$ is sub-divided into corresponding regions by the sub-division module 15. The sub-patches and sub-divided regions are then processed by a feature point matching module 16. Essentially, patches are placed around each distinctive point of high curvature for the feature of interest in the current image and also in a defined search area within the successive image. Pairwise matching then takes place between these points. The feature point matching module 16 is configured to determine the best match between each sub-patch (i) and sub-divided region (j). It achieves this by first by finding the maximum correlation coefficient of all pairs (i,j) and deciding the match. Next the matching module 16 excludes that correlation coefficient from all other matches. Next, the maximum correlation coefficient of all the remaining pairs is calculated. Finally, the procedure is repeated until all matches above a certain pre-chosen threshold value are obtained.

In the final correlation stage, a fix point is generated by module 17. The fix point generation can be done by any one of several known ways. One choice may be preferable above others depending upon the characteristics of the data provided. For example, if the data is particularly noisy and the likelihood of spurious matches high, then the best pair-wise correlation should be used to update the fix position. Alternatively, for data with a low noise content, for a set of pair-wise correlation matches (above a threshold value), the average position should be used to update the fix position. A third alternative makes a constrained match, i.e. a sub-set of pair-wise correlation matches (above a threshold value) is used to provide an average fix position. The sub-set is chosen so that the average fix position is within a given distance from the fix position established for the previous frame. This constraint provides an added safeguard against a pair-wise mis-match and hence an erroneous fix point.

I claim:

1. Target tracking apparatus including: input means, for receiving from an imager, a first set of data which comprises an image representing a viewed scene containing a target to be tracked, and for generating a second set of data which comprises a reference patch defining an area within said viewed scene containing the target;

template generating means for receiving said second set of data and for generating a third set of data which comprises a binary template representing the target;

and correlator means for receiving said first, second and third sets of data and for performing a multiplicative correlation process on said first, second and third sets of data and for generating a fix point representing the position of the target within said viewed scene.

2. Target tracking apparatus as claimed in claim 1 in which said template generating means includes: edge detection means for producing edge maps of the target contained within the reference patch; curvature generation means for identifying regions of high curvature in said edge maps and producing a curvature image of the target; binarisation means for producing a binary image from said curvature image; and dilation means for executing a morphological dilation around high curvature points in said binary image thereby generating a binary template.

3. Target tracking apparatus as claimed in claim 1 and further including an acquisition module for generating an initial reference patch.

4. Target tracking apparatus including:

input means, for receiving from an imager, a first set of data which comprises an image representing a viewed scene containing a target to be tracked, and for generating a second set of data which comprises a reference patch defining an area within said viewed scene containing the target;

template generating means for receiving said second set of data and for generating a third set of data which comprises a binary template representing the target;

and correlator means for receiving said second and third sets of data and for performing a subtractive correlation between said second and third sets of data and for generating a fix point representing the position of the target within said viewed scene.

5. Target tracking apparatus as claimed in claim 4 in which said correlator means includes: a subdivision module for subdividing said binary template and said reference patch into respective sub-patches; and feature-point matching means for determining a best match between respective sub-patches thereby to generate said fix-point.

6. Target tracking apparatus as claimed in claim 4 in which said template generating means includes: edge detection means for producing edge maps of the target contained within the reference patch; curvature generation means for identifying regions of high curvature in said edge maps and producing a curvature image of the target; binarisation means for producing a binary image from said curvature image; and dilation means for executing a morphological dilation around high curvature points in said binary image thereby generating a binary template.

7. Target tracking apparatus as claimed in claim 4 and further including an acquisition module for generating an initial reference patch.

* * * * *